C. LITTLE.
ROAD SCRAPER.

No. 99,921. Patented Feb. 15, 1870

Witnesses: Inventor:
Cyrus Little

UNITED STATES PATENT OFFICE.

CYRUS LITTLE, OF VAN WERT, OHIO.

IMPROVED ROAD-SCRAPER.

Specification forming part of Letters Patent No. 99,921, dated February 15, 1870.

*To all whom it may concern:*

Be it known that I, CYRUS LITTLE, of Van Wert, in the county of Van Wert, and in the State of Ohio, have invented certain new and useful Improvements in Road-Scrapers; and I do hereby declare that the following is a full, clear, and exact description thereof, reference being had to the accompanying drawings, and to the letters of reference marked thereon, making a part of this specification.

The nature of my invention consists in the construction and general arrangement of a road-scraper, as will be hereinafter fully set forth.

In order to enable others skilled in the art to which my invention appertains to make and use the same, I will now proceed to describe its construction and operation, referring to the annexed drawings, in which—

Figure 1:
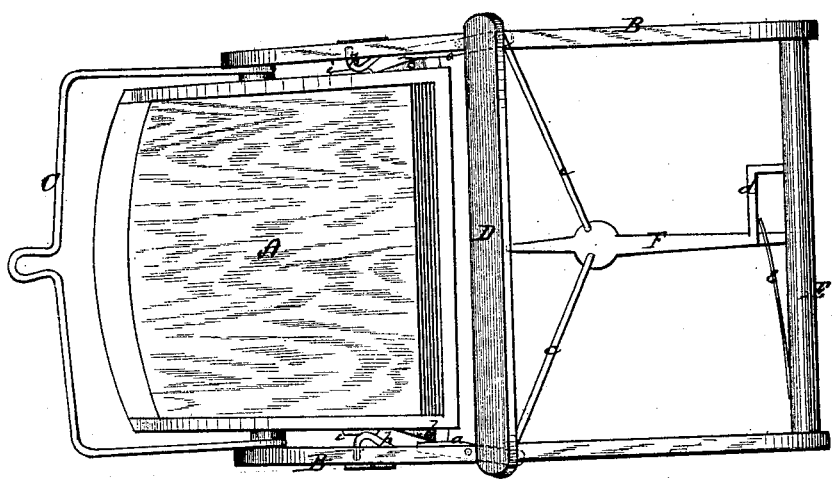
Figure 2:
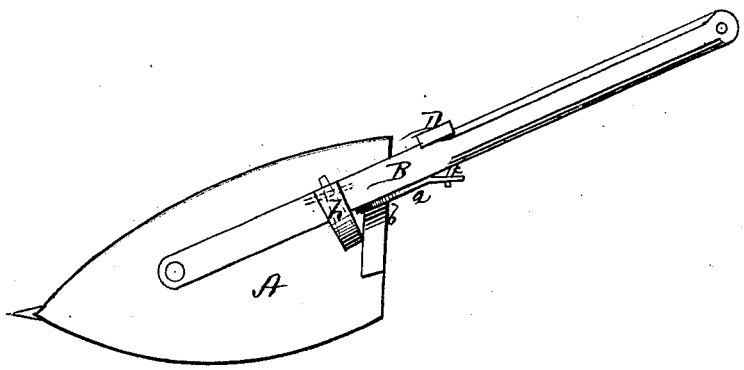

Figure 1 is a plan view, and Fig. 2 a side view.

A represents the scoop, which is pivoted between the front ends of the side beams, B B, and on the same pivots is hung the bail C, to which the team is attached. The beams B B are connected immediately in rear of the tail-board of the scoop by a cross-beam, D, and also at their rear ends by a rod, E, which forms the handle of the scraper. The scoop A is held in position by two latches, $a\ a$, pivoted one to each of the beams B, and catches on a projection, $b$, at each end of the tail-board of the scoop. The latches $a\ a$, by rods $c\ c$, are connected with a pull-rod, F, the ends of which are placed in holes in the center of the cross-bar D and handle E. At the upper end of the pull-rod F is a handle, $d$, by which the operator can withdraw the latches $a\ a$ from the projections $b\ b$, allowing the scoop to revolve. A spring, $e$, attached to the rod or handle E, presses the pull-rod inward again, so as to cause the latches to hold the scoop in proper position again, preventing it from revolving.

On the sides of the scoop A are placed catches $i\ i$, which are caught in notches on the inner side of a guide-plate spring, $h$, attached one to each beam B, for the purpose of lifting the scoop to make it revolve.

Having thus fully described my invention, what I claim as new, and desire to secure by Letters Patent, is—

The arrangement of the scoop A, with projections $b$, catches $i$, beams B, springs $h$, catches $a$, rod F, rods $c$, handles D, and rod and spring $d\ e$, all substantially as set forth.

In testimony that I claim the foregoing I have hereunto set my hand this 17th day of July, 1869.

CYRUS LITTLE.

Witnesses:
   WM. H. DENISTON,
   A. McGARVEN.